United States Patent
Saito et al.

(10) Patent No.: US 11,987,656 B2
(45) Date of Patent: May 21, 2024

(54) METHOD FOR PRODUCING FLUORINATED POLYMER AND METHOD FOR PRODUCING FLUORINATED ION EXCHANGE POLYMER

(71) Applicant: AGC Inc., Tokyo (JP)

(72) Inventors: Susumu Saito, Tokyo (JP); Satoru Hommura, Tokyo (JP); Hiroyuki Watabe, Tokyo (JP)

(73) Assignee: AGC Inc., Tokyo (JP)

( * ) Notice: Subject to any disclaimer, the term of this patent is extended or adjusted under 35 U.S.C. 154(b) by 835 days.

(21) Appl. No.: 17/061,703

(22) Filed: Oct. 2, 2020

(65) Prior Publication Data

US 2021/0070903 A1    Mar. 11, 2021

Related U.S. Application Data

(63) Continuation of application No. PCT/JP2019/019567, filed on May 16, 2019.

(30) Foreign Application Priority Data

May 18, 2018 (JP) ................................. 2018-096465

(51) Int. Cl.
| | |
|---|---|
| C08F 216/38 | (2006.01) |
| C08F 214/18 | (2006.01) |
| C08J 5/22 | (2006.01) |
| H01M 8/1004 | (2016.01) |
| H01M 8/1039 | (2016.01) |
| H01M 8/1088 | (2016.01) |
| H01M 8/10 | (2016.01) |

(52) U.S. Cl.
CPC ........ *C08F 214/184* (2013.01); *C08F 216/38* (2013.01); *C08J 5/225* (2013.01); *H01M 8/1004* (2013.01); *H01M 8/1039* (2013.01); *H01M 8/1088* (2013.01); *C08J 2327/12* (2013.01); *H01M 2008/1095* (2013.01)

(58) Field of Classification Search
CPC .................................................. C08F 214/184
See application file for complete search history.

(56) References Cited

U.S. PATENT DOCUMENTS

| | | | | |
|---|---|---|---|---|
| 3,865,845 A | * | 2/1975 | Resnick ................... | C08F 24/00 549/455 |
| 4,431,786 A | * | 2/1984 | Squire ..................... | C08F 34/02 526/247 |
| 5,121,461 A | * | 6/1992 | Yamamoto ......... | G02B 6/02033 385/141 |
| 5,498,682 A | * | 3/1996 | Navarrini ............. | C07D 317/42 526/247 |
| 2004/0013916 A1 | * | 1/2004 | Rao ...................... | H01M 8/1004 429/405 |
| 2009/0227749 A1 | * | 9/2009 | Tayanagi .............. | C08F 214/18 526/214 |
| 2018/0178210 A1 | * | 6/2018 | Miyatake ................. | B01J 47/12 |
| 2018/0198149 A1 | * | 7/2018 | Kim ..................... | H01M 8/1032 |

FOREIGN PATENT DOCUMENTS

| | | |
|---|---|---|
| JP | 4032738 B2 | 1/2008 |
| WO | WO 2013/157395 A1 | 10/2013 |

OTHER PUBLICATIONS

International Search Report dated Aug. 6, 2019 in PCT/JP2019/019567 filed May 16, 2019, 2 pages.

* cited by examiner

*Primary Examiner* — Irina Krylova

(74) *Attorney, Agent, or Firm* — Element IP, PLC

(57) ABSTRACT

To provide a method for producing a fluorinated polymer, in which it is possible to efficiently and easily control the molecular weight to be proper when polymerizing a perfluoromonomer having a dioxolane ring containing a polymerizable double bond in the ring skeleton, and in which the obtainable fluorinated polymer is less susceptible to a decrease in molecular weight even when contacted with a base. A method for producing a fluorinated polymer, comprising polymerizing a raw-material mixture which contains at least one of a monomer composition M11 which comprises a perfluoromonomer represented by the formula m11 and a fluorinated monomer m11H having at least some of fluorine atoms of said perfluoromonomer substituted by hydrogen atoms, and a monomer composition M12 which comprises a perfluoromonomer represented by formula m12 and a fluorinated monomer m12H having at least some of fluorine atoms of said perfluoromonomer substituted by hydrogen atoms, wherein the total amount of the fluorinated monomer mil H and the fluorinated monomer m12H is from 10 to 1,100 ppm to the total amount of the monomer composition M11 and the monomer composition M12.

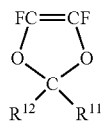

m11

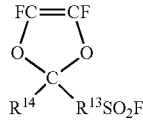

m12

10 Claims, No Drawings

METHOD FOR PRODUCING FLUORINATED POLYMER AND METHOD FOR PRODUCING FLUORINATED ION EXCHANGE POLYMER

TECHNICAL FIELD

The present invention relates to a method for producing a fluorinated polymer having dioxolane ring structures and a method for producing a fluorinated ion exchange polymer.

BACKGROUND ART

A fluorinated polymer having ring structures can be obtained by polymerizing a monomer component containing a ring-structured monomer. As the ring-structured monomer, a perfluoromonomer represented by the following formula m11-1 having a dioxolane ring structure containing a polymerizable double bond in the ring skeleton, is known to be useful from the viewpoint of ease of synthesis, polymerizability, properties of the obtained polymer, etc.

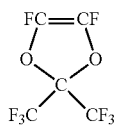

m11-1

The fluorinated polymer having dioxolane ring structures obtainable by polymerizing a perfluoromonomer (hereinafter referred to also as "PDD monomer") having a dioxolane ring structure containing a polymerizable double bond in the ring skeleton, has high transparency whereby it is used as a raw material for optical fibers, and has high affinity with oxygen whereby it is used as a membrane which is required to have oxygen permeability.

In recent years, as an electrolyte material to be contained in a catalyst layer or a solid polymer electrolyte membrane of a membrane electrode assembly for a polymer electrolyte fuel cell, a fluorinated polymer having ring structures and ion exchange groups, has been proposed from the viewpoint of excellent power generation characteristics of the membrane electrode assembly (see Patent Documents 1 and 2).

The fluorinated polymer having ion exchange groups, is obtainable by polymerizing a monomer having a precursor group capable of being converted to an ion exchange group, such as $-SO_2F$, and optionally another monomer, to obtain a precursor fluorinated polymer having precursor groups, and converting the precursor groups to ion exchange groups. For example, $-SO_2F$ can be converted to a sulfonic acid group via a hydrolysis step using a base.

PRIOR ART DOCUMENTS

Patent Documents

Patent Document 1: Japanese Patent No. 4032738
Patent Document 2: WO 2013/157395

DISCLOSURE OF INVENTION

Technical Problem

At the time of synthesizing the PDD monomer, as an impurity, a fluorinated monomer (hereinafter referred to also as "PDD-H monomer") in which some of the fluorine atoms in the PDD monomer are hydrogen atoms, is generated. If the PDD monomer contains a large amount of PDD-H monomer, there arises such a problem that the molecular weight of the polymer cannot be made high at the time of the polymerization. Therefore, the PDD-H monomer is usually separated and removed by a purification method such as distillation. However, if the PDD-H monomer is sufficiently removed to increase the purity of the PDD monomer, the PDD monomer will be lost much during the purification such as distillation. As a result, the yield of the PDD monomer will be largely lowered. Further, in a case where a highly pure PDD monomer is used for the polymerization, the molecular weight of the fluorinated polymer tends to be high, and a chain transfer agent or the like will be required at the time of the polymerization in order to make the molecular weight of the fluorinated polymer within a proper range.

On the other hand, in the production of a fluorinated polymer having ion exchange groups, a base is used at the time when the precursor groups are hydrolyzed to be converted to ion exchange groups. However, in a case where the precursor fluorinated polymer has units based on a PDD-H monomer, there have been such cases that the molecular weight of the fluorinated polymer has tended to be lowered due to the action of the base.

An object of the present invention is to provide a method for producing a fluorinated polymer having dioxolane ring structures and a method for producing a fluorinated ion exchange polymer, whereby, at the time of polymerizing a PDD monomer, the POD monomer can be efficiently utilized, the molecular weight can be easily controlled to a proper level, and the obtainable fluorinated polymer is less likely to be susceptible to a decrease in the molecular weight even when contacted with a base.

Solution to Problem

The present invention provides a method for producing a fluorinated polymer having the following constructions [1] to [15].

[1] A method for producing a fluorinated polymer, comprising polymerizing a raw material mixture containing at least one of
a monomer composition M11 which comprises a perfluoromonomer represented by the following formula m11 and a fluorinated monomer m11H having at least some of fluorine atoms in said perfluoromonomer substituted by hydrogen atoms, and
a monomer composition M12 which comprises a perfluoromonomer represented by the following formula m12 and a fluorinated monomer m12H having at least some of fluorine atoms in said perfluoromonomer substituted by hydrogen atoms,
characterized in that the total amount of the fluorinated monomer m11H and the fluorinated monomer m12H is from 10 to 1,100 ppm to the total amount of the monomer composition M11 and the monomer composition M12:

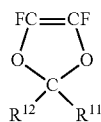

m11

-continued

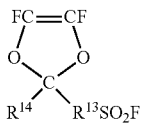
m12 provided that $R^{11}$, $R^{12}$ and $R^{14}$ are each independently a fluorine atom, a $C_{1-10}$ perfluoroalkyl group, or a group having an etheric oxygen atom between carbon-carbon atoms in a $C_{2-10}$ perfluoroalkyl group, and
$R^{13}$ is a single bond, a $C_{1-10}$ perfluoroalkylene group or a group having an etheric oxygen atom between carbon-carbon atoms in a $C_{2-10}$ perfluoroalkylene group.

[2] The method for producing a fluorinated polymer according to [1], wherein the fluorinated monomer m11H is a fluorinated monomer represented by the following formula m21, and the fluorinated monomer m12H is a fluorinated monomer represented by the following formula m22:

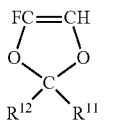
m21

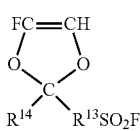
m22

[3] The method for producing a fluorinated polymer according to [1] or [2], wherein the raw material mixture further contains tetrafluoroethylene.

[4] The method for producing a fluorinated polymer according to any one of [1] to [3], wherein the raw material mixture further contains a polymerization medium.

[5] The method for producing a fluorinated polymer according to any one of [1] to [4], wherein the raw material mixture does not contain a chain transfer agent.

[6] The method for producing a fluorinated polymer according to any one of [1] to [5], wherein the raw material mixture further has at least one type of monomer selected from the group consisting of a monomer represented by the following formula m31, a monomer represented by the following formula m32, a monomer represented by the following formula m33, a monomer represented by the following formula m34, a monomer represented by the following formula m35, a monomer represented by the following formula m36 and a monomer represented by the following formula m37:

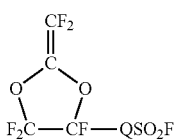
m31

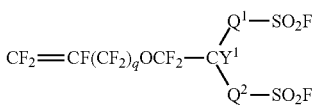
m32

$$CF_2\!=\!CF(CF_2)_m\!-\!O_p\!-\!(CF_2)_n\!-\!SO_2F \qquad m33$$

$$CF_2\!=\!CF(OCF_2CFX)_r\!-\!O_t\!-\!(CF_2)_6\!-\!SO_2F \qquad m34$$

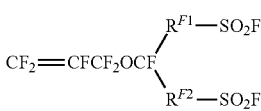
m35

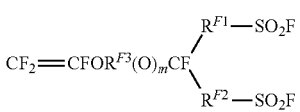
m36

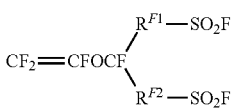
m37 provided that Q is a single bond, a $C_{1-10}$ perfluoroalkylene group, or a group having an etheric oxygen atom between carbon-carbon atoms in a $C_{2-10}$ perfluoroalkylene group,
q is 0 or 1,
$Y^1$ is a fluorine atom or a monovalent perfluoroorganic group,
$Q^1$ is a perfluoroalkylene group which may have an etheric oxygen atom,
$Q^2$ is a single group, or a perfluoroalkylene group which may have an etheric oxygen atom,
M is 0 or 1, and when p is 0, m is 0,
p is 0 or 1,
n is an integer of from 1 to 12,
X is a fluorine atom or a trifluoromethyl group,
r is an integer of form 1 to 3,
t is 0 or 1,
s is an integer of from 1 to 12,
$R^{F1}$ and $R^{F2}$ are 01.3 perfluoroalkylene groups, and $R^{F1}$ and $R^{F2}$ may be the same or different, and
$R^{F3}$ is a $C_{1-6}$ perfluoroalkylene group.

[7] The method for producing a fluorinated polymer according to any one of [1] to [6], wherein the proportion of the total amount of the monomer composition M11 and the monomer composition M12 in the total amount of all monomers contained in the raw material mixture is from 20 to 90 mol %.

[8] A method for producing a fluorinated ion exchange polymer, characterized by polymerizing the raw material mixture to be used in the method for producing a fluorinated polymer as defined in any one of [1] to [7], wherein the raw material mixture further contains a monomer having a precursor group for an ion exchange group, to obtain a precursor group-containing fluorinated polymer, then contacting the precursor group-containing fluorinated polymer with a base to convert the precursor group to an ion exchange group.

[9] The method for producing a fluorinated ion exchange polymer according to [8], wherein the ion exchange group is a sulfonic acid group.

[10] The method for producing a fluorinated ion exchange polymer according to [8] or [9], wherein the monomer having the precursor group is at least one member selected from the group consisting of a monomer represented by the following formula m31, a monomer represented by the following formula m32, a monomer represented by the following formula m33, a monomer represented by the following formula m34, a monomer represented by the following formula m35, a monomer represented by the following formula m36, and a monomer represented by the following formula m37:

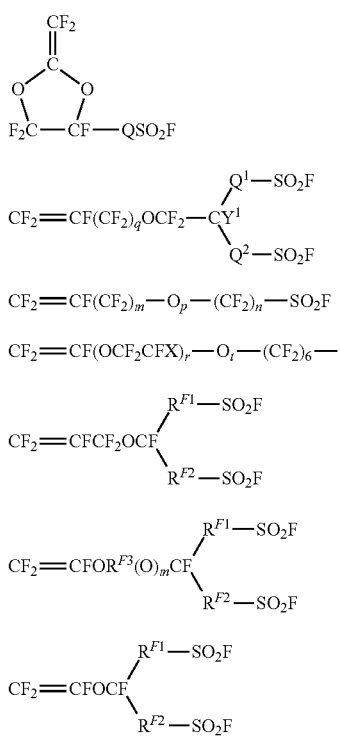

provided that Q is a single bond, a $C_{1-10}$ perfluoroalkylene group, or a group having an etheric oxygen atom between carbon-carbon atoms in a $C_{2-10}$ perfluoroalkylene group,
q is 0 or 1,
$Y^1$ is a fluorine atom or a monovalent perfluoroorganic group,
$Q^1$ is a perfluoroalkylene group which may have an etheric oxygen atom,
$Q^2$ is a single bond, or a perfluoroalkylene group which may have an etheric oxygen atom,
m is 0 or 1, and when p is 0, m is 0,
p is 0 or 1,
n is an integer of from 1 to 12,
X is a fluorine atom or a trifluoromethyl group,
r is an integer of from 1 to 3,
t is 0 or 1,
s is an integer of from 1 to 12,
$R^{F1}$ and $R^{F2}$ are $C_{1-3}$ perfluoroalkylene groups, and $R^{F1}$ and $R^{F2}$ may be the same or different, and
$R^{F3}$ is a $C_{1-6}$ perfluoroalkylene group.
[11] A fluorinated polymer obtained by polymerizing a raw material mixture containing at least one of
a monomer composition M11 which comprises a perfluoromonomer represented by the following formula m11, and a fluorinated monomer m11H having at least some of fluorine atoms in said perfluoromonomer substituted by hydrogen atoms, and
a monomer composition M12 which comprises a perfluoromonomer represented by the following formula m12, and a fluorinated monomer m12H having at least some of fluorine atoms in said perfluoromonomer substituted by hydrogen atoms,
characterized in that the total amount of the fluorinated monomer m11H and the fluorinated monomer m12H is from 10 to 1,100 ppm to the total amount of the monomer composition M11 and the monomer composition M12:

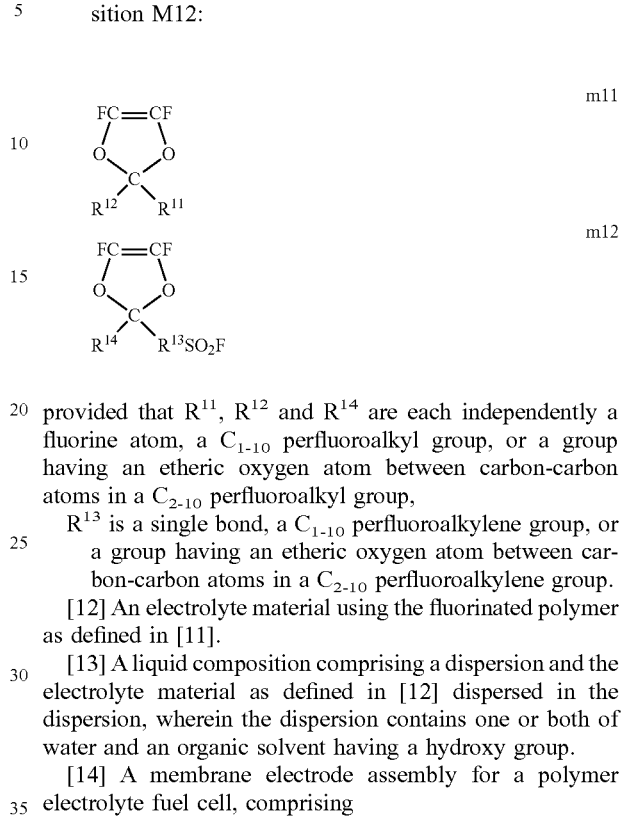

provided that $R^{11}$, $R^{12}$ and $R^{14}$ are each independently a fluorine atom, a $C_{1-10}$ perfluoroalkyl group, or a group having an etheric oxygen atom between carbon-carbon atoms in a $C_{2-10}$ perfluoroalkyl group,
$R^{13}$ is a single bond, a $C_{1-10}$ perfluoroalkylene group, or a group having an etheric oxygen atom between carbon-carbon atoms in a $C_{2-10}$ perfluoroalkylene group.
[12] An electrolyte material using the fluorinated polymer as defined in [11].
[13] A liquid composition comprising a dispersion and the electrolyte material as defined in [12] dispersed in the dispersion, wherein the dispersion contains one or both of water and an organic solvent having a hydroxy group.
[14] A membrane electrode assembly for a polymer electrolyte fuel cell, comprising
an anode having a catalyst layer containing a proton conductive polymer,
a cathode having a catalyst layer containing a proton conductive polymer, and
a solid polymer electrolyte membrane disposed between the anode and the cathode,
characterized in that the proton conductive polymer contained in at least one of the catalyst layers of the cathode and the anode is the electrolyte material as defined in [12].
[15] A polymer electrolyte fuel cell comprising the membrane electrode assembly as defined in [14].

Advantageous Effects of Invention

According to the method for producing a fluorinated polymer of the present invention, at the time of polymerizing a PDD monomer, the POD monomer can be efficiently utilized and the molecular weight can be easily controlled to a proper level. In addition, the obtainable fluorinated polymer is less likely to be susceptible to a decrease in the molecular weight even when contacted with a base.

According to the method for producing a fluorinated ion exchange polymer of the present invention, at the time of polymerizing a POD monomer and a monomer having a precursor group for an ion exchange group, the POD monomer can be efficiently utilized and the molecular weight can be easily controlled to a proper level. In addition, at the time when the obtainable fluorinated polymer is brought into contact with a base to convert the precursor group to an ion exchange group, the molecular weight is less likely to be lowered.

DESCRIPTION OF EMBODIMENTS

The meanings of the following terms in the present specification are as follows.

A "unit" in a polymer means a unit based on a monomer, formed by polymerization of the monomer. The unit may be a unit directly formed by a polymerization reaction of a monomer, or a unit having a part of said unit converted to another structure by treating the polymer.

An "ion exchange group" means a group in which a part of cation contained in the group can be exchanged for another cation, and means a group having $H^+$, a monovalent metal cation, an ammonium ion, etc. The ion exchange group may be a sulfonic acid group, a sulfonimide group, a sulfonemethide group, a carboxylic acid group, etc.

The "precursor group for an ion exchange group" is a group which can be converted to an ion exchange group by being hydrolyzed e.g. by being brought into contact with a base.

A "sulfonic acid group" includes $-SO_3^-H^+$ and $-SO_3^-M^+$ (wherein $M^+$ is a monovalent metal ion, or an ammonium ion in which one or more hydrogen atoms may be substituted by a hydrocarbon group).

The "TQ value" is an index for the molecular weight and softening temperature of a polymer. The larger the TQ value, the larger the molecular weight. It is a temperature at which a polymer extrusion rate becomes to be 100 mm³/sec when melt extrusion is conducted using a nozzle having a length of 1 mm and an inner diameter of 1 mm under an extrusion pressure of 2.94 MPa.

The total amount (ppm) of the fluorinated monomer m11H and the fluorinated monomer m12H to the total amount of the monomer composition M11 and the monomer composition M12 is a value calculated from a peak area ratio measured by gas chromatography (hereinafter referred to also as "GC"). That is, it is a proportion of the total peak area of the fluorinated monomer m11H and the fluorinated monomer m12H to the total peak area of the monomer composition M11 and the monomer composition M12 at the time when the monomer composition M11 and the monomer composition M12 are analyzed. The measurement conditions of GC are as described in Examples given later.

In the present specification, the monomer represented by the formula m11 is also referred to as the monomer m11. The same applies to monomers and compounds represented by other formulas.

In the method for producing a fluorinated polymer of the present invention, the following raw material mixture is polymerized (polymerization step).

[Raw Material Mixture]

The raw material mixture contains at least one of the monomer composition M11 and the monomer composition M12.

The monomer composition M11 comprises a perfluoromonomer represented by the following formula m11 (hereinafter referred to also as a perfluoromonomer m11) and a fluorinated monomer m11H having at least some of fluorine atoms in said perfluoromonomer m11 substituted by hydrogen atoms.

The monomer composition M12 comprises a perfluoromonomer represented by the following formula m12 (hereinafter referred to also as a perfluoromonomer m12) and a fluorinated monomer m12H having at least some of fluorine atoms in said perfluoromonomer m12 substituted with hydrogen atoms.

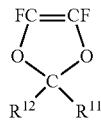

m11

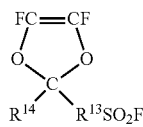

m12

$R^{11}$ is a fluorine atom, a $C_{1-10}$ perfluoroalkyl group or a group having an etheric oxygen atom between carbon-carbon atoms in a $C_{2-10}$ perfluoroalkyl group. As $R^{11}$, a $C_{1-5}$ perfluoroalkyl group is preferred, and a trifluoromethyl group is more preferred. The perfluoroalkyl group may be linear or branched, and is preferably linear.

$R^{12}$ and $R^{14}$ are each independently a fluorine atom, a $C_{1-10}$ perfluoroalkyl group or a group having an etheric oxygen atom between carbon-carbon atoms in a $C_{2-10}$ perfluoroalkyl group. As $R^{12}$ and $R^{14}$, each independently a trifluoromethyl group is preferred. The perfluoroalkyl group may be linear or branched, and is preferably linear.

$R^{13}$ is a single bond, a $C_{1-10}$ perfluoroalkylene group or a group having an etheric oxygen atom between carbon-carbon atoms in a $C_{2-10}$ perfluoroalkylene group. As $R^{13}$, a $C_{2-4}$ perfluoroalkylene group or a group having an etheric oxygen atom between carbon-carbon atoms in a $C_{3-4}$ perfluoroalkylene group, is preferred. The perfluoroalkylene group may be linear or branched, and is preferably linear.

The perfluoromonomer m11 may, for example, be monomers m11-1 to m11-6. Among them, the monomer m11-1, the monomer m11-2 and the monomer m11-3 are preferred, and the monomer m11-1 is more preferred, from the viewpoint of a high ion exchange capacity due to a small molecular weight and monomer recoverability due to a low boiling point.

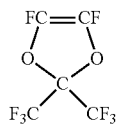

m11-1

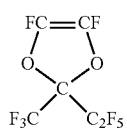

m11-2

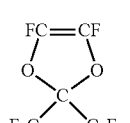

m11-3

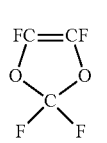

m11-4

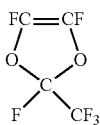
m11-5

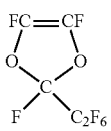
m11-6

The perfluoromonomer m12 may, for example, be monomers m12-1 and m12-2.

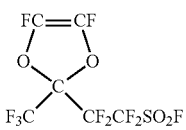
m12-1

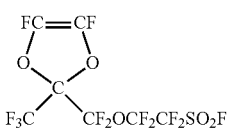
m12-2

The perfluoromonomer m11 can be synthesized by the method described in Macromolecule, Vol. 26, No. 22, 1993, p. 5829-5834; JP-A-6-92957, etc.

The perfluoromonomer m12 can be synthesized by the method described in JP-A-2006-152249, etc.

The fluorinated monomer m11H is produced as an impurity in the production of the perfluoromonomer m11. The fluorinated monomer m12H is produced as an impurity in the production of the perfluoromonomer m12.

The number of hydrogen atoms which each of the fluorinated monomer m11H and the fluorinated monomer m12H may have, may be one, or two or more.

As the fluorinated monomer m11H, one in which one of the fluorine atoms bonded to the carbon atoms constituting the polymerizable double bond is a hydrogen atom, in the ring skeleton of the dioxolane ring of the perfluoromonomer m11, is likely to be formed as a by-product. The same applies to the fluorinated monomer m12H. Therefore, as the fluorinated monomer m11H, the monomer m21 is likely to be formed in a large amount, and as the fluorinated monomer m12H, the monomer m22 is likely to be formed in a large amount.

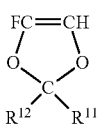
m21

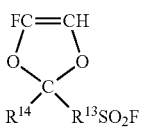
m22

The total amount of the fluorinated monomer m11H and the fluorinated monomer m12H is from 10 to 1,100 ppm, preferably from 10 to 700 ppm, particularly preferably from 12 to 300 ppm, to the total amount of the monomer composition M11 and the monomer composition M12.

When the total amount of the fluorinated monomer m11H and the fluorinated monomer m12H is within the above range, at the time of the production of the monomer compositions M11 and M12, a loss of the perfluoromonomers m11 and m12 due to separation and removal of the excess fluorinated monomers m11H and m12H can be reduced, and the perfluoromonomers m11 and m12 can be efficiently utilized for polymerization.

Further, since the fluorinated monomers m11H and m12H also function as chain transfer agents, the molecular weight of the obtained fluorinated polymer can be properly controlled even if the raw material mixture does not contain a molecular weight regulator such as a chain transfer agent, and at the time of producing a polymer solution of the fluorinated polymer or the fluorinated ion exchange polymer, the solubility in a solvent will be good.

Furthermore, since the fluorinated polymer does not have an excessive number of hydrogen atoms, the molecular chain is unlikely to be cleaved even when brought into contact with a base, so that a fluorinated polymer which is less likely to be susceptible to a decrease in the molecular weight is obtainable. Therefore, for example, even in the hydrolysis step as described later, the decrease in the molecular weight of the fluorinated polymer is small, and one having a high molecular weight can be obtained as a fluorinated ion exchange polymer.

The monomer composition M11 can be obtained, for example, by synthesizing a perfluoromonomer m11 by a known method to obtain a crude product containing a fluorinated monomer m11H, and purifying the crude product by e.g. distillation to adjust the content of the fluorinated monomer m11H to be a predetermined amount. Further, the monomer composition M12 can be obtained in the same manner.

In the crude product, the content of the fluorinated monomer m11H or m12H is, for example, from 2,000 to 10,000 ppm to the total mass of the crude product.

A polymerization inhibitor may be added to the obtained crude product. The polymerization inhibitor may, for example, be 2-tert-butyl-1,4-benzoquinone, 6-tert-butyl-2,4-xylenol, 2,6-di-tert-butyl-p-cresol, p-mentha-1,8-diene, 2,5-di-tert-butyl-1,4-benzoquinone, 2,6-di-tert-butyl-1,4-benzoquinone, N-nitrosophenylhydroxylamine aluminum salt, etc. Such a polymerization inhibitor can be separated from the perfluoromonomer m11 or m12 at the time of distillation.

The method for distilling the crude product may be a known distillation method such as simple distillation, packed column-equipped simple distillation, purification distillation, etc. The temperature, pressure, etc. at the time of the distillation may be suitably set depending on e.g. the boiling point of the perfluoromonomer m11 or m12.

The raw material mixture may contain other monomers, as the case requires, so long as the effects of the present invention will not be impaired.

Other monomers may be a monomer (hereinafter referred to also as "monomer 3") having a precursor group for an ion exchange group (hereinafter simply referred to also as "precursor group") (but, excluding the perfluoromonomer m12 and the fluorinated monomer m12H), a monomer (hereinafter referred to also as "monomer m4") having no precursor group (but excluding the perfluoromonomer m11 and the fluorinated monomer m12H), etc.

In the monomer m3, the precursor group will be hydrolyzed to an ion exchange group by the action of a base. As the precursor group, —SO$_2$F is preferred from the viewpoint of proton conductivity and chemical durability.

The monomer m3 may, for example, be a monomer having a precursor group and a ring structure, or a monomer having a precursor group and no ring structure.

As the monomer having a precursor group and a ring structure, a monomer m31 may be mentioned.

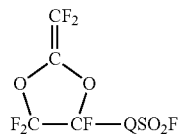
m31

Q is a single bond, a C$_{1-10}$ perfluoroalkylene group or a group having an etheric oxygen atom between carbon-carbon atoms in a C$_{2-10}$ perfluoroalkylene group. As Q, a C$_{2-4}$ perfluoroalkylene group or a group having an etheric oxygen atom between carbon-carbon atoms in a C$_{3-4}$ perfluoroalkylene group, is preferred. The perfluoroalkylene group may be linear or branched, and is preferably linear.

As the monomer m31, for example, the monomers m31-1 to m31-3 are preferred, and from such a viewpoint that the softening temperature will not become too high, the monomer m31-1 is more preferred.

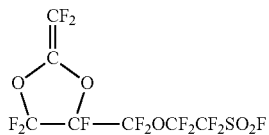
m31-1

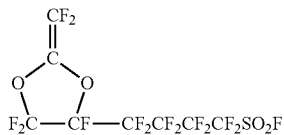
m31-2

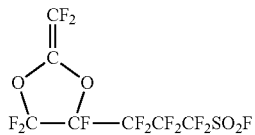
m31-3

The monomer m31 can be synthesized by the methods described in WO 2003/037885, JP-A-2005-314388, JP-A-2009-040909, etc.

As the monomer having a precursor group and no ring structure, for example, monomers m32 to m37 may be mentioned.

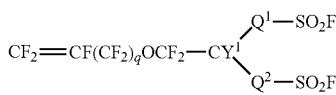
m32

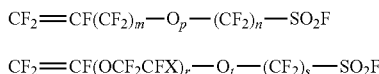
m33

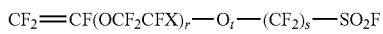
m34

CF$_2$=CF(OCF$_2$CFX)$_r$—O$_t$—(CF$_2$)$_s$—SO$_2$F

-continued

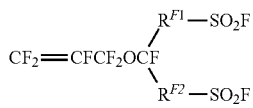
m35

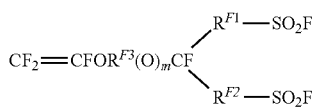
m36

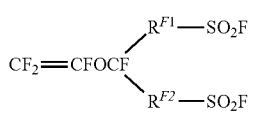
m37 q is 0 or 1.

q is preferably 0 from the viewpoint of excellent reactivity with the PDD monomer.

Y$^1$ is a fluorine atom or a monovalent perfluoro organic group.

Y$^1$ is preferably a fluorine atom or a 01-6 linear perfluoroalkyl group which may have an etheric oxygen atom.

Q$^1$ is a perfluoroalkylene group which may have an etheric oxygen atom.

Q$^2$ is a single bond or a perfluoroalkylene group which may have an etheric oxygen atom.

When the perfluoroalkylene group for Q$^1$ and Q$^2$ has an etheric oxygen atom, the number of oxygen atoms may be one, or two or more. Further, the oxygen atom may be inserted between carbon-carbon atoms in the perfluoroalkylene group or may be inserted at the carbon atom bond terminal, but is not inserted at the terminal directly bonded to the sulfur atom.

The perfluoroalkylene group may be linear or branched, and is preferably linear.

The number of carbon atoms in the perfluoroalkylene group is preferably from 1 to 6, more preferably from 1 to 4. When the number of carbon atoms is at most 6, the boiling point of the raw material compound becomes low, and the distillation purification becomes easy. Further, when the number of carbon atoms is at most 6, the decrease in ion exchange capacity of the fluorinated polymer will be suppressed and the decrease in proton conductivity will be suppressed.

Q$^2$ is preferably a C$_{1-6}$ perfluoroalkylene group which may have an etheric oxygen atom. When Q$^2$ is a C$_{1-6}$ perfluoroalkylene group which may have an etheric oxygen atom, as compared with the case where Q$^2$ is a single bond, stability of power generation performance will be excellent at the time when the polymer electrolyte fuel cell is operated for a long period of time.

At least one of Q$^1$ and Q$^2$ is preferably a C$_{1-6}$ perfluoroalkylene group having an etheric oxygen atom. A monomer having a C$_{1-6}$ perfluoroalkylene group having an etheric oxygen atom can be synthesized without undergoing a fluorination reaction by fluorine gas, and thus, the yield will be good and the production will be easy.

m is 0 or 1, and when p is 0, m is 0.

m is preferably 0 from the viewpoint of excellent reactivity with the PDD monomer.

p is 0 or 1.

n is an integer of from 1 to 12.

X is a fluorine atom or a trifluoromethyl group.

r is an integer of from 1 to 3.

t is 0 or 1.

s is an integer of from 1 to 12.

$R^{F1}$ and $R^{F2}$ are $C_{1-3}$ perfluoroalkylene groups. $R^{F1}$ and $R^{F2}$ may be the same or different.

$R^{F3}$ is a $C_{1-3}$ perfluoroalkylene group.

As the monomer m32, the monomers m32-1 to m32-8 are preferred, and the monomer m32-1 is more preferred, from such a viewpoint that the production of the fluorinated polymer will be easy, and industrial implementation will be easy.

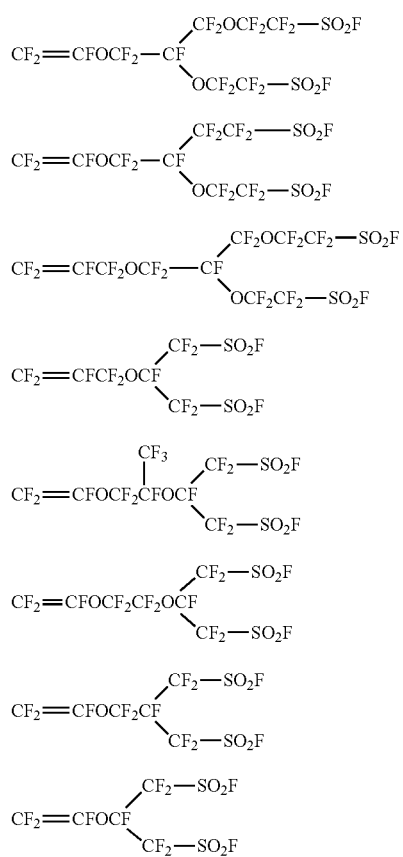

As the monomer m33, monomers m33-1 and m33-2 are preferred.

   m33-1

   m33-2

As the monomer m34, the monomer m34-1 is preferred.

   m34-1

The monomer m32 can be synthesized by the method described in WO 2007/013533, JP-A-2008-202039, etc.

The monomer m33 and the monomer m34 can be produced, for example, by known synthetic methods, such as the method described in "Du Pont Innovation", Vol, 43, No. 3, 1973, P. 10, edited by D. J. Vaughham, the method described in Examples of U.S. Pat. No. 4,358,412, etc.

The monomer m4 may be the monomer m41, tetrafluoroethylene (hereinafter referred to also as "TFE"), chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (hexafluoropropylene, etc.), a (perfluoroalkyl)ethylene ((perfluorobutyl) ethylene, etc.), a (perfluoroalkyl)propene (3-perfluorooctyl-1-propene, etc.), a perfluoro(alkyl vinyl ether), monomer m42, etc., and preferred is TFE. Since TFE has high crystallinity, it has an effect of suppressing swelling when the polymer (H) contains water, and it is possible to reduce the water content of the polymer. Among these monomers m4, one type may be used alone, or two or more types may be used in combination.

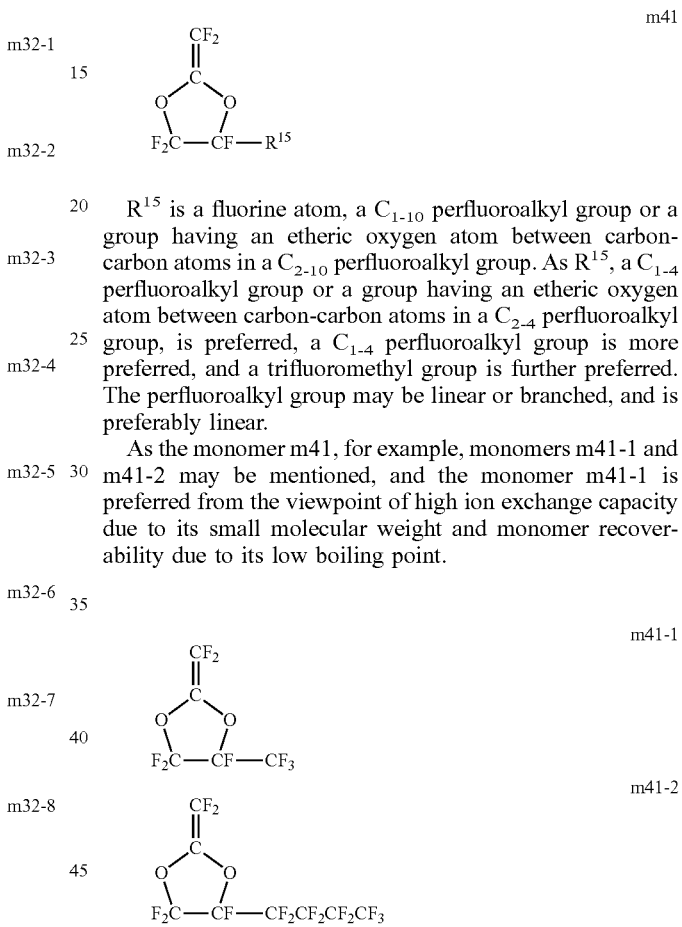

$R^{15}$ is a fluorine atom, a $C_{1-10}$ perfluoroalkyl group or a group having an etheric oxygen atom between carbon-carbon atoms in a $C_{2-10}$ perfluoroalkyl group. As $R^{15}$, a $C_{1-4}$ perfluoroalkyl group or a group having an etheric oxygen atom between carbon-carbon atoms in a $C_{2-4}$ perfluoroalkyl group, is preferred, a $C_{1-4}$ perfluoroalkyl group is more preferred, and a trifluoromethyl group is further preferred. The perfluoroalkyl group may be linear or branched, and is preferably linear.

As the monomer m41, for example, monomers m41-1 and m41-2 may be mentioned, and the monomer m41-1 is preferred from the viewpoint of high ion exchange capacity due to its small molecular weight and monomer recoverability due to its low boiling point.

The monomer m41 can be synthesized by the method described in WO2000/056694; Izvestiya Akademii Nauk SSSR, Seriya Khimicheskaya, 1989, Vol. 4, p. 938-42, etc.

When the monomer m42 is copolymerized, the glass transition temperature (Tg) of the fluorinated polymer can be lowered.

   m42

Here, $R^f$ is a $C_{1-12}$ perfluoroalkyl group, a group having an etheric oxygen atom between carbon-carbon atoms in a $C_{2-10}$ perfluoroalkyl group, or a $C_{2-12}$ perfluoroalkenyl group.

As the monomer m42, for example, m42-1 to m42-26 may be mentioned.

   m42-1

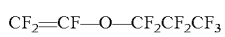   m42-2

   m42-3

| | |
|---|---|
| $CF_2=CF-O-CF_2CF_2CF=CF_2$ | m42-4 |
| $CF_2=CF-O-CF_2CF_2OCF_2CF_2OCF_2CF_3$ | m42-5 |
| $CF_2=CF-O-CF_2CF_2OCF_2CF_2CF_2OCF_3$ | m42-6 |
| $CF_2=CF-O-CF_2OCF_2CF_2CF_3$ | m42-7 |
| $CF_2=CF-O-CF_2OCF_2OCF_2OCF_3$ | m42-8 |
| $CF_2=CF-O-CF_2OCF_3$ | m42-9 |
| $CF_2=CF-O-CF_2(CF_2)_3OCF_3$ | m42-10 |
| $CF_2=CF-O-CF_2CF_2CF_2OCF_2CF_3$ | m42-11 |
| $CF_2=CF-O-CF_2CF_2OCF_2CF_2OCF_3$ | m42-12 |
| $CF_2=CF-O-CF_2OCF_2CF_2OCF_3$ | m42-13 |
| $CF_2=CF-O-CF_2OCF_2CF_3$ | m42-14 |
| $CF_2=CF-O-CF_2CF_2OCF_2OCF_2OCF_3$ | m42-15 |
| $CF_2=CF-O-CF_2CF_2CF_2O(CF_2)_3O(CF_2)_3OCF_2CF_2CF_3$ | m42-16 |
| $CF_2=CF-O-CF_2CF_2OCF_2OCF_2OCF_2CF_2OCF_3$ | m42-17 |
| $CF_2=CF-O-CF_2CF_2OCF_2CF_2OCF_2CF_2OCF_3$ | m42-18 |
| $CF_2=CF-O-CF_2CF_2CF_2O(CF_2)_3OCF_2CF_2CF_3$ | m42-19 |
| $CF_2=CF-O-CF_2CF_2OCF_2CF_2OCF_2OCF_3$ | m42-20 |
| $CF_2=CF-O-CF_2CF_2OCF_2OCF_2OCF_2OCF_3$ | m42-21 |
| $CF_2=CF-O-CF_2CF_2CF_2OCF_3$ | m42-22 |
| $CF_2=CF-O-CF_2CF_2OCF_2OCF_3$ | m42-23 |
| $CF_2=CF-O-CF_2CF_2OCF_3$ | m42-24 |
| $CF_2=CF-O-CF_2CF_2OCF_2CF_3$ | m42-25 |
| $CF_2=CF-O-CF_2CF_2CF_2OCF_2CF_2F_3$ | m42-26 |

The raw material mixture preferably contains a monomer having a precursor group. In such a case, after the raw material mixture is polymerized, the obtained fluorinated polymer is brought into contact with a base to convert the precursor group to an ion exchange group, whereby a fluorinated ion exchange polymer having dioxolane ring structures and ion exchange groups can be obtained. Such a fluorinated ion exchange polymer is excellent in power generation characteristics of a membrane electrode assembly when used as a catalyst layer of a membrane electrode assembly for a polymer electrolyte fuel cell or as an electrolyte material to be contained in a solid polymer electrolyte membrane.

As the monomer having a precursor group, a perfluoromonomer m12 and a monomer m3 may be mentioned, and from such a viewpoint that the synthesis is easy, at least one type selected from the group consisting of a perfluoromonomer m12, a monomer m31, a monomer m32, a monomer m33 and a monomer m34 is preferred, and from such a viewpoint that it can contain a large amount of other components while increasing the ion exchange capacity, the monomer m32 is particularly preferred.

The case where the raw material mixture contains a monomer having a precursor group may be (1) a case where the monomer composition M12 is contained and the monomer m3 is not contained, (2) a case where the monomer composition M12 is not contained and the monomer m3 is contained, or (3) a case where the monomer composition M12 and the monomer m3 are contained.

In the case of (2), the raw material mixture contains the monomer composition M11. In the cases of (1) and (3), the raw material mixture may further contain the monomer composition M11, as the case requires. In each case, the raw material mixture may further contain the monomer m4.

The raw material mixture preferably contains TFE as the monomer m4. Since TFE has high crystallinity, it has an effect of suppressing swelling of a fluorinated polymer at the time when the polymer has contained water, and it can reduce the water content of the fluorinated polymer.

The proportion of the total amount of the monomer composition M11 and the monomer composition M12 in the total amount of all monomers contained in the raw material mixture is preferably from 20 to 90 mol %, more preferably from 40 to 80 mol %.

When the proportion of the total amount of the monomer composition M11 and the monomer composition M12 is at least the above lower limit value, at the time when the obtainable fluorinated ion exchange polymer is used for a catalyst layer of a membrane electrode assembly for a polymer electrolyte fuel cell or for a solid polymer electrolyte membrane; the membrane electrode assembly is likely to exhibit excellent power generation characteristics. When the proportion of the total amount of the monomer composition M11 and the monomer composition M12 is at most the above upper limit value, the glass transition temperature of the obtainable fluorinated polymer or fluorinated ion exchange polymer will not become too high; the flooding phenomenon (water clogging phenomenon) in the catalyst layer is unlikely to occur under low temperature and high humidity conditions; and the power generation characteristics of the membrane electrode assembly are less likely to deteriorate.

The proportion of the monomer having a precursor group in the total amount of all monomers contained in the raw material mixture can be set according to the desired ion exchange capacity of the fluorinated polymer after converting the precursor group to an ion exchange group.

For example, in a case where the monomer having a precursor group is the monomer m32, the proportion of the monomer having a precursor group to the total amount of all monomers contained in the raw material mixture is preferably from 5 to 60 mol %, more preferably from 10 to 50 mol %.

The proportion of TFE in the total amount of all monomers contained in the raw material mixture is preferably from 0 to 30 mol %, more preferably from 0 to 20 mol %.

Specific examples of preferable combinations and proportions of monomers in the raw material composition may be a combination of from 0 to 15 mol % of TFE, from 40 to 70 mol % of the monomer m32, and from 15 to 45 mol % of the monomer composition M11 comprising the monomer m11-1 and a fluorinated monomer having at least some of fluorine atoms in said monomer m11-1 substituted by hydrogen atoms; a combination of from 0 to 15 mol % of TFE, from 55 to 95 mol % of the monomer m33, and from 5 to 40 mol % of the monomer composition M11 comprising the monomer m11-1 and a fluorinated monomer having at least some of fluorine atoms in said monomer m11-1 substituted by hydrogen atoms; and a combination of from 0 to 15 mol % of TFE, from 50 to 90 mol % of the monomer m34, and from 10 to 40 mol % of the monomer composition M11 comprising the monomer m11-1 and a fluorinated monomer having at least some of fluorine atoms in said monomer m11-1 substituted by hydrogen atoms.

The raw material mixture may contain, in addition to the monomers, a polymerization medium, a polymerization initiator, a chain transfer agent (excluding the monomer m11H and the monomer m12H), a polymerization inhibitor, etc., as the case requires.

When the raw material mixture contains a polymerization medium, the control of the polymerization becomes easy, e.g. the heat removal during the polymerization becomes good. As the polymerization medium, preferred is a polymerization medium such as a chlorofluorocarbon, a hydrochlorofluorocarbon, a hydrofluorocarbon, a hydrofluoroether, a perfluorocarbon or the like, and more preferred is a hydrofluorocarbon or a hydrofluoroether that does not affect the ozone layer.

The content of the polymerization medium in the raw material mixture is, for example, from 0 to 50% by mass.

As the polymerization initiator, a common polymerization initiator can be used, and diacyl peroxides (disuccinic acid peroxide, benzoyl peroxide, perfluoro-benzoyl peroxide, lauroyl peroxide, bis(pentafluoropropionyl) peroxide, etc.), azo compounds (2,2'-azobis(2-amidinopropane) hydrochloric acid, 4,4'-azobis(4-cyanovaleric acid), dimethyl 2,2'-azobisisobutyrate, azobisisobutyronitrile, etc.), peroxyesters (t-butylperoxyisobutyrate, t-butylperoxypivalate, etc.), peroxydicarbonates (diisopropylperoxydicarbonate, bis(2-ethylhexyl) peroxydicarbonate, etc.), hydroperoxides (diisopropylbenzene hydroperoxide, t-butyl hydroperoxide, etc.), dialkyl peroxides (di-t-butyl peroxide, perfluoro-di-t-butyl peroxide), etc. may be mentioned.

The content of the polymerization initiator in the raw material mixture can be suitably set according to the type of the monomers and the polymerization form, but is preferably from 0.0001 to 3 parts by mass, more preferably from 0.0001 to 2 parts by mass, to 100 parts by mass in total of all monomers contained in the raw material mixture.

In the production method of the present invention, the fluorinated monomer m11H and the fluorinated monomer m12H will act both as monomers and as chain transfer agents, and therefore, addition of a chain transfer agent is not necessarily required. However, the raw material mixture may contain a chain transfer agent other than the fluorinated monomer m11H and the fluorinated monomer m12H, as the case requires. The chain transfer agent may be one commonly used as a chain transfer agent.

Specific examples include alcohols (methanol, ethanol, 2,2,2-trifluoroethanol, 2,2,3,3-tetrafluoropropanol, 1,1,1,3,3,3-hexafluoroisopropanol, 2,2,3,3,3-pentafluoropropanol, etc.), hydrocarbons (n-pentane, n-hexane, cyclohexane, etc.), hydrofluorocarbons ($CF_2H_2$, etc.), ketones (acetone, etc.), mercaptans (methyl mercaptan, etc.), esters (methyl acetate, ethyl acetate, etc.) and ethers (diethyl ether, methyl ethyl ether, etc.).

The content of the chain transfer agent in the raw material ixture is preferably from 0 to 50 parts by mass, more preferably from 0 to 10 parts by mass, particularly preferably 0 part by mass, to 100 parts by mass in total of all monomers contained in the raw material mixture. That is, it is particularly preferred that the raw material mixture does not contain a chain transfer agent. The smaller the content of the chain transfer agent, the better the mechanical strength of the fluorinated polymer.

[Polymerization Step]

In the polymerization step, the above raw material mixture is polymerized.

As the polymerization method, a polymerization method such as an emulsion polymerization method, a solution polymerization method, a suspension polymerization method or a bulk polymerization method may be used. As the polymerization method, a solution polymerization method or a bulk polymerization method is preferred, since a fluorine-based emulsifier having a perfluoroalkyl group having 7 or more carbon atoms, which may cause bioaccumulation, is not used.

The raw material mixture may be charged all at once, or may be charged continuously or intermittently. Further, a part of the components of the raw material mixture may be continuously or intermittently charged during the polymerization.

As the polymerization temperature, an optimum value may be selected depending on the types of monomers, the charging ratio, etc., but is preferably from 10 to 150° C., since it is suitable for industrial implementation.

The polymerization pressure (gauge pressure) is preferably from 0.1 to 5.0 MPa, since it is suitable for industrial implementation.

Further, in a case where a gaseous monomer such as TFE is used as the monomer, it may be diluted with nitrogen if the gas phase monomer concentration is high.

In the case of the solution polymerization method, as the case requires, unreacted monomers are recovered from the mixture by a known method, and the obtained fluorinated polymer solution is mixed with an aggregating medium to obtain a fluorinated polymer. Then, as the case requires, the fluorinated polymer is washed with a cleaning medium. The cleaning medium and the cleaning method are not particularly limited, and a known method can be used.

The fluorinated polymer obtainable by polymerizing the raw material mixture has at least one of units based on the perfluoromonomer m11 and units based on the fluoromonomer m11H, and units based on the perfluoromonomer m12 and units based on the fluoromonomer m12H.

The fluorinated polymer may further have units based on other monomers, as the case requires. In a case where the fluorinated polymer is used as a precursor for the electrolyte material to be contained in the catalyst layer of the membrane electrode assembly, the fluorinated polymer preferably has units based on a monomer having a precursor group.

As a preferred combination of units in the fluorinated polymer, in the above-mentioned preferred combinations and proportions of the monomers in the raw material composition, a combination of units obtained by polymerizing such monomers is preferred, and the preferred proportions of the units in the fluorinated polymer are also the same.

The TQ value of the fluorinated polymer is preferably from 230 to 320° C., more preferably from 250 to 300° C. When the TQ value of the fluorinated polymer is at least the lower limit value in the above range, the mechanical strength and hot water resistance will tend to be good. When the TQ value of the fluorinated polymer is at most the upper limit value in the above range, molding will be easy. Further, in a case where the precursor group is converted to an ion exchange group by contact with a base to obtain a fluorinated ion exchange polymer, a liquid composition of the fluorinated ion exchange polymer will be easily obtained.

The weight average molecular weight (Mw) of the fluorinated polymer is preferably from 100,000 to 1,000,000, more preferably from 200,000 to 800,000. When Mw of the fluorinated polymer is at least the lower limit value in the above range, the mechanical strength and hot water resistance will tend to be good. When Mw of the fluorinated polymer is at most the upper limit value in the above range, molding will be easy. Further, in a case where the precursor group is converted to an ion exchange group by contact with a base to obtain a fluorinated ion exchange polymer, a liquid composition of the fluorinated ion exchange polymer will be easily obtained.

Mw of the fluorinated polymer is a value converted to standard polymethylmethacrylate (PMMA), as measured by gel permeation chromatography (GPO). Specifically, it is measured by the measuring method as described in Examples given below.

[Hydrolysis Step]

In the hydrolysis step, in a case where the raw material mixture contains a monomer having a precursor group; that is; in a case where the fluorinated polymer has units based on a monomer having a precursor group (hereinafter, such a polymer will be referred to also as "precursor group-containing fluorinated polymer"), as the case requires, the fluorinated polymer is brought into contact with a base. As a result; the precursor group-containing fluorinated polymer will be hydrolyzed to obtain a fluorinated ion exchange polymer in which the precursor groups in the precursor group-containing fluorinated polymer are converted to ion exchange groups.

The hydrolysis step can be carried out by a known method; and for example, the method described in WO 2011/013578 may be mentioned. For example, as a method of converting a —$SO_2F$ group to an acid type sulfonic acid group (—$SO_3^-H^+$ group), a method of contacting the —$SO_2F$ group in the fluorinated polymer with a base to hydrolyze it to a salt type sulfonic acid group, and contacting the salt type sulfonic acid group with an acid to convert it to an acid type sulfonic acid group, may be mentioned. As the base, sodium hydroxide, potassium hydroxide or the like may be mentioned. As the acid, hydrochloric acid or sulfuric acid may be mentioned.

The ion exchange capacity of the fluorinated ion exchange polymer is preferably from 0.5 to 2.5 meq/g dry resin; more preferably from 1.0 to 2.0 meq/g dry resin. When the ion exchange capacity is at least the lower limit value in the above range, the conductivity of the fluorinated ion exchange polymer will be high, whereby when used in the catalyst layer of the membrane electrode assembly, a sufficient battery output can be obtained. When the ion exchange capacity is at most the upper limit value in the above range, the production of the fluorinated ion exchange polymer will be easy.

The weight average molecular weight (Mw) of the fluorinated ion exchange polymer is preferably from 500,000 to 1,500,000, more preferably from 600,000 to 1,400,000. When Mw of the fluorinated ion exchange polymer is at least the lower limit value in the above range, the mechanical strength and hot water resistance will tend to be good. When Mw of the fluorinated ion exchange polymer is at most the upper limit value in the above range, molding will be easy and a liquid composition of the fluorinated ion exchange polymer will be easily obtained.

Mw of the fluorinated ion exchange polymer is a value converted to standard polyethylene glycol (PEG) as measured by GPO. Specifically, it is measured by the measuring method as described in Examples given below, Preferred combinations and proportions of units in the fluorinated ion exchange polymer, are the same as in a case where in the above-mentioned preferred combinations and proportions in the fluorinated polymer, the fluorinated polymer is a precursor group-containing fluorinated polymer in which precursor groups have been hydrolyzed.

In the present invention, the molecular weight of the fluorinated polymer is less likely to decrease even if the fluorinated polymer is brought in contact with a base in e.g. the hydrolysis step. This is assumed to be due to the following reason.

When polymerized, the fluorinated monomers m11H and m12H in the monomer compositions M11 and M12 become to be units in the fluorinated polymer, and these units have hydrogen atoms. In particular, in a case where the fluorinated monomers m11H and m12H are the monomers m21 and m22, the fluorinated polymer becomes to be a polymer having hydrogen atoms in the main chain. When a base comes in contact with the fluorinated polymer, a reaction such as deHF occurs at the site having a hydrogen atom, whereby the main chain is cleaved, and the molecular weight is reduced.

In the fluorinated polymer obtained by polymerizing the raw material mixture, the contents of the fluorinated monomers m11H and m12H are adjusted to proper ranges, so that the content of hydrogen atoms in the fluorinated polymer is controlled to a proper range, whereby the cleavage of the main chain by the base and the accompanying decrease in the molecular weight are suppressed.

Since the fluorinated ion exchange polymer has dioxolane ring structures and ion exchange groups, it is preferably used for forming a catalyst layer or a solid polymer electrolyte membrane in a membrane electrode assembly. Further, it can be used for forming other membranes (a proton selective permeation membrane to be used for water electrolysis, hydrogen peroxide production, ozone production, waste acid recovery, etc., a cation exchange membrane for salt electrolysis, a diaphragm for a redox flow battery, a cation exchange membrane for electrodialysis to be used for desalination or salt production, etc.).

The fluorinated ion exchange polymer is used, for example, as a liquid composition comprising the fluorinated ion exchange polymer and a liquid medium.

The liquid medium may, for example, be water, a hydrocarbon alcohol, a fluorinated solvent, etc. As the liquid medium, one type may be used alone, or two or more types may be used as mixed.

The liquid composition may further contain other components in addition to the fluorinated ion exchange polymer and the liquid medium.

EXAMPLES

In the following, the present invention will be described in detail with reference to Examples, but the present invention is not limited thereto.

Among Ex, 1 to 6, Ex. 1 to 3 are Examples of the present invention, and other Ex. are Comparative Examples.

The evaluation methods used in each Ex. described later are shown below.

(TQ Value)

Using a flow tester (CFT-500D, manufactured by Shimadzu Corporation), the temperature at which the extrusion amount of the fluorinated polymer became 100 $mm^3$/sec was obtained as the TQ value.

(Gas Chromatography (GC))

The analysis by GC was carried out under the following conditions.

Device: GC-2014, manufactured by Shimadzu Corporation
Column: Capillary column, DB-1 60 m
Detector: FID (hydrogen flame ionization detector)
Carrier gas: Helium Injection temperature: 170° C.
Detector temperature: 250° C.
Column temperature: Held at 40° C. for 10 minutes, heated up to 240° C. at 10° C./min, and held for 10 minutes.
Split ratio: 1/30
Injection volume: 0.2 μL
(Weight Average Molecular Weight (Mw) of Fluorinated Polymer)
Mw of the fluorinated polymer was measured under the following conditions.
Device: HLC-8320GPC, manufactured by TOSOH CORPORATION
Column: FL mixed-C (5 μm, 7.5×300 mm)×2
Detector: ELSD (evaporative light scattering detector)
Mobile phase: AK225 SEC Grade 1 [AK225cb/HFIP (99/1 vol %)]
Flow rate: 1.0 mL/min
Oven temperature: 37° C.
System temperature: 37° C.
Concentration: 0.2 w/v %
Injection volume: 100 μL
Molecular weight standard: PMMA
Here, AK225cb is $CClF_2CF_2CHClF$, and HFIP is hexafluoro-2-propanol.
(Mw of Fluorinated Ion Exchange Polymer)
Mw of the fluorinated ion exchange polymer was measured under the following conditions.
Device: HLC-8320GPC, manufactured by TOSOH CORPORATION.
Column: TOSOH TSK-GEL (registered trademark) α-M× TOSOH TSK-GEL α-3000
Detector: ELSD
Mobile phase: 10 mM di-n-butylammonium acetate (DBAA)-added methanol
Flow rate: 1.0 mL/min
Oven temperature: 37° C.
System temperature: 37° C.
Concentration: 0.5 w/v %
Injection volume: 50 mL
Molecular weight standard: PEG (Evaluation of Decrease in Molecular Weight)

As an index for decrease in molecular weight due to hydrolysis, a case where Mw (as converted to PEG) of the fluorinated ion exchange polymer H after hydrolysis of the fluorinated polymer was at least 500,000, was rated as ○, and a case where Mw was less than 500,000, was rated as x.

(Solubility in AK225 SEC Grade 1)

In a 13 cc glass screw tube, 0.03 g of a mass of a fluorinated polymer that had been heat-treated at 200° C., was charged, and 3 cc of AK225 SEC Grade 1 was put, whereupon the mixture was left in a 60° C. dryer. On the way, after 1 hour, the mixture was once taken out, intermittently stirred for about 1 minute by a shaker, then returned to the dryer, and after another 1 hour, taken out. Immediately after being taken out, the mixture was again stirred with a shaker for about 1 minute and left to stand at room temperature for 1 hour. A case where undissolved material did not remain at the bottom of the screw tube, was rated as ○, and a case where undissolved material remained, was rated as x.

(Solubility of Fluorinated Ion Exchange Polymer)

A dispersion was prepared in the same manner as in step (a) of Ex. 1 described in WO 2017/033685, except that a fluorinated ion-exchange polymer was used as the polymer, and then, the obtained dispersion was filtered through a stainless 100 mesh filter. After that, whether or not an undissolved residue remained on the filter, was visually confirmed, whereby a case where the undissolved residue did not remain, was rated as ○, and a case where the undissolved residue remained, was rated as x.

Production of Monomer Composition

Production Example 1

In accordance with a known method (the method described in U.S. Pat. Nos. 2,925,424, 3,865,845, Journal of Fluorine Chemistry, 9 (1977) 359-375), 8,000 g of a liquid crude product containing 3,865 g of the monomer m11-1, was obtained. In the crude product, the monomer m21-1 was contained which is a fluorinated monomer m11H corresponding to the monomer m11-1. The concentration of the fluorinated monomer m11H in the crude product was 2,600 ppm. The concentration is an area percent measured by GC under the above-mentioned conditions.

Purification distillation of the obtained crude product was conducted by using a distillation column under the following distillation conditions.

The crude product was placed in a warm water tank, and 1% by mass, to the crude product, of Topanol A (polymerization inhibitor, 6-tert-butyl-2,4-xylenol, manufactured by Tokyo Chemical Industry Co., Ltd.) was added to the crude product. After the addition, the temperature in the warm water bath was gradually raised from 30° C. The condenser was cooled at −20° C., and Topanol A was continuously added at 0.02 mL/min from the top of the packed column during distillation. The reflux ratio was automatically controlled by distilling a solenoid valve with a timer. The reflux ratio was 20 up to an outflow rate of 15%, and then the reflux ratio was changed to 5. When the total amount of the distillate reached 3,980 g and the internal temperature of the distillation column kettle became high, the distillation was stopped by cooling.

The concentration of the monomer m21-1 remained less than 300 ppm until the outflow rate reached about 75%, and thereafter, the concentration gradually increased for each fraction, and the concentration in the final fraction was 2,200 ppm.

A plurality of purified products (monomer compositions M11-1 to M11-6) which contain the monomer m11-1 and the monomer m21-1 and which are different in the content of the monomer m21-1, were prepared by selecting the fractions or mixing the fractions.

Distillation Conditions
Bottom capacity: 10 L
Packed column: Height: 700 mm, inner diameter: 50 mm
Theoretical plate number: 36 plates
Reflux ratio control: Automatic control to distill solenoid valve by timer Initial distillation reflux ratio: 20
Main distillation reflux ratio: 5
Pressure: Atmospheric pressure <Production of Fluorinated Polymer and Fluorinated Ion Exchange Polymer>

(Monomer m3)
As the monomer m3, a monomer m32-1 was prepared.

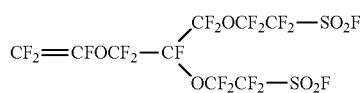

m32-1

(Polymerization Initiator)
PFB: $(C_3F_7COO)_2$ (manufactured by NOF CORPORATION, PFB, 10-hour half-life temperature: 21° C.)

(Polymerization Medium)
AC2000: $CF_3CF_2CF_2CF_2CF_2CF_2H$

Ex. 1

In a stainless steel autoclave having a capacity of 495 mL equipped with a jacket and a stirrer, 283.74 g of the monomer m32-1, 69.7 g (69.49 g as converted to the monomer m11-1) of the monomer composition M11-1 (a purified product wherein the content of the monomer m21-1 in the monomer m11-1 is 14 ppm) obtained in Production Example 1, and 26 g of AC2000, were charged, and then, freeze degassing was conducted twice by using liquid nitrogen. After heating the inside of the autoclave to 24° C., 0.1 MPa of nitrogen gas was introduced into the autoclave. After confirming 1c) that the pressure did not change, 8.59 g of TFE was charged into the autoclave, and the total pressure was set to be 0.172 MPa [gauge]. 2.535 g of a solution having 3.33% by mass of PFB dissolved in AC2000, was pressurized with nitrogen gas and added from an addition line connected to the autoclave. Next, in order to wash the addition line, 5 g of AC2000 was added from the addition line. Polymerization was carried out at an internal temperature of the autoclave being 24° C. and at a rotational speed of 100 rpm. Upon expiration of 8.5 hours after the initiation of the polymerization, the gas in the system was purged, and nitrogen substitution was carried out.

By setting the jacket temperature to be 24° C. and the stirring speed to be 10 rpm, the pressure inside the autoclave was slowly reduced to 200 kPa [abs] to distill the unreacted monomer m11-1, the polymerization medium, etc. from the mixed solution inside the autoclave. The distillate was passed through a cooling trap of a mixed solution of AK225cb and dry ice, and 60.1 g was recovered after 5 hours. During that time, the pressure in the autoclave also gradually decreased.

The residue in the autoclave was diluted with 200.6 g of AC2000 and stirred at a rotational speed of 50 rpm for 4 hours to obtain a polymer solution.

The polymer solution (25° C.) withdrawn from the autoclave was added to a flocculating medium (20° C.) of 1,000 g of AC2000 and 250 g of methanol to form a fluorinated polymer in the form of particles to obtain a dispersion. After stirring for 30 minutes, 650 g of the dispersion was withdrawn, and 188 g of methanol was added to the polymer particle dispersion. After stirring for 30 minutes, filtration was conducted to obtain a particulate fluorinated polymer F-1.

The particulate fluorinated polymer F-1 was added to a washing medium of 145 g of AC2000 and 60 g of methanol, and then, washing by conducting stirring and filtration, was repeated twice.

The particulate fluorinated polymer F-1 was vacuum dried at 80° C. for 16 hours and then vacuum heat-treated at 210° C. for 16 hours to obtain 52.52 g of the fluorinated polymer F-1.

The proportions of the respective units in the fluoropolymer F-1 by $^{19}$F-NMR were monomer m32-1/monomer m11-1/TFE=18.7/68.1/13.2 (molar ratio). The TQ value was 271° C. With respect to the fluorinated polymer F-1, the solubility in AK225 SEC Grade 1 was evaluated, and GPC measurement was carried out. Mw was 610,000.

The fluorinated polymer F-1 was immersed in an aqueous solution containing 30% by mass of dimethyl sulfoxide and 15% by mass of potassium hydroxide at 80° C. for 72 hours. Thus, $-SO_2F$ groups in the fluorinated polymer F-1 were hydrolyzed and converted to $-SO_3K$ groups. After repeating washing with water at 80° C. three times, the polymer was immersed in a 3 mol/L hydrochloric acid aqueous solution at room temperature for 30 minutes. Treatment of exchanging the hydrochloric acid aqueous solution and washing with water was further repeated 5 times, and then, washing with water was repeated 3 times to obtain a fluorinated ion exchange polymer H-1 in which $-SO_3K$ groups in the polymer were converted to sulfonic acid groups. Mw of the fluorinated ion exchange polymer H-1 was 1.2 million.

With respect to the fluorinated ion exchange polymer H-1, the solubility was evaluated by the method as described above, whereby no undissolved residue remained on the filter.

The results are summarized in Table 1.

Ex. 2 to 6

The fluorinated polymers and fluorinated ion exchange polymers were obtained in the same manner as in Ex, 1, except that the type of the monomer composition, the amount of each raw material used, the polymerization conditions, etc. were changed as shown in Table 1.

The results are summarized in Table 1. In Table 1, "MPaG" indicates "MPa [gauge]". "MKT" indicates "jacket".

TABLE 1

|  |  |  | Ex. 1 | Ex. 2 | Ex. 3 | Ex. 4 | Ex. 5 | Ex. 6 |
|---|---|---|---|---|---|---|---|---|
| Total amount of fluorinated monomer m11H and fluorinated monomer m12H to total amount of monomer composition M11 and monomer composition M12 |  | ppm | 14 | 532 | 1047 | 1151 | 2325 | 1 |
| Polymerization | Volume of reactor |  | mL | 495 | 230 | 1006 | 495 | 230 | 230 |
|  | Monomer | m32-1 | g | 283.74 | 131.84 | 443.26 | 297.98 | 131.84 | 131.9 |
|  | composition | M11-1 | g | 69.49 | — | — | — | — | — |
|  |  | M11-2 | g | — | 32.20 | — | — | — | — |

TABLE 1-continued

|  |  |  |  | Ex. 1 | Ex. 2 | Ex. 3 | Ex. 4 | Ex. 5 | Ex. 6 |
|---|---|---|---|---|---|---|---|---|---|
|  |  | M11-3 | g | — | — | 119.31 | — | — | — |
|  |  | M11-4 | g | — | — | — | 80.02 | — | — |
|  |  | M11-5 | g | — | — | — | — | 32.09 | — |
|  |  | M11-6 | g | — | — | — | — | — | 32.40 |
|  |  | TFE | g | 8.59 | 4.06 | 16.82 | 11.46 | 4.09 | 4.21 |
|  | Polymerization medium |  | g | 26 | 9.5 | 4.22 | 3.25 | 9.5 | 9.5 |
|  | Polymerization initiator |  | mg | 84.54 | 39.63 | 126.59 | 85.12 | 39.32 | 39.32 |
|  | Polymerization initiator solution |  | g | 2.53 | 1.19 | 4.35 | 2.74 | 1.18 | 1.59 |
|  | Polymerization initiator concentration |  | % | 3.33 | 3.33 | 2.91 | 3.11 | 3.33 | 2.36 |
|  | Amount of solvent |  | g | 5 | 5 | 12 | 5 | 5 | 5 |
|  | Polymerization temperature |  | °C. | 24 | 24 | 24 | 24 | 24 | 24 |
|  | Pressure of nitrogen gas |  | Mpa | 0.1 | 0.1 | 0.1 | 0.1 | 0.1 | 0.1 |
|  | Total pressure |  | MPaG | 0.172 | 0.175 | 0.202 | 0.22 | 0.182 | 0.18 |
|  | Polymerization time |  | h | 8.5 | 9.1 | 12 | 12 | 10 | 11 |
|  | Stirring rotational speed |  | rpm | 100 | 100 | 60→30→10 | 100 | 100 | 100 |
|  | Stirring rotational speed |  | rpm | 10 | 10 | 10 | 10 | 10 | 10 |
| Reduced pressure | JKT setting temperature during distillation |  | °C. | 24 | 24 | 24 | 24 | 24 | 24 |
| Recovery | Distillation time |  | h | 5 | 3 | 9 | 8 | 3 | 3 |
|  | Distillate amount |  | g | 60.1 | 30.0 | 18.0 | 42.1 | 27.4 | 31.2 |
| Withdrawal | Added solvent |  | g | 200.6 | 100.3 | 700 | 351 | 100.1 | 100.4 |
|  | Stirring rotational speed |  | rpm | 50 | 50 | 25 | 25 | 50 | 50 |
|  | Stirring time |  | h | 4 | 3 | 4 | 4 | 3 | 3 |
| Flocculation | AC2000 |  | g | 1000 | 500 | 2000 | 1000 | 500 | 500 |
|  | Methanol |  | g | 250 | 125 | 500 | 250 | 125 | 125 |
|  | Withdrawal |  | g | 650 | 325 | 1300 | 650 | 325 | 325 |
|  | Additional methanol |  | g | 188 | 93.8 | 375 | 188 | 93.8 | 93.8 |
| Washing | AC2000 |  | g | 145 | 72.5 | 290 | 145 | 72.5 | 72.5 |
|  | Methanol |  | g | 60 | 30 | 120 | 60 | 30 | 30 |
|  | Number of times |  | Times | 2 | 2 | 2 | 2 | 2 | 2 |
| Fluorinated | Yield |  | g | 52.52 | 23.13 | 140 | 81.88 | 24.79 | 18.92 |
| polymer F | Composition | m32-1 | mol % | 18.7 | 16.8 | 18.4 | 16.9 | 17.5 | 16.7 |
|  |  | m11-1 | mol % | 68.1 | 67.8 | 68.8 | 67.5 | 68.2 | 68.6 |
|  |  | TFE | mol % | 13.2 | 15.3 | 12.8 | 15.6 | 14.3 | 14.7 |
|  | Ion exchange capacity |  | meq/g | 1.26 | 1.18 | 1.24 | 1.18 | 1.21 | 1.17 |
|  | TQ value |  | °C. | 271 | 272 | 270 | 282 | 269 | 310 |
|  | Solubility in AK225 SEC Grade 1 60° C. 1 h |  |  | ○ | ○ | ○ | ○ | ○ | X |
|  | Mw (ten thousands) (converted to PMMA) |  |  | 61 | 53 | 50 | 48 | 49 | 89 |
| Fluorinated | Mw (ten thousands) (converted to PEG) |  |  | 120 | 64 | 51 | 42 | 28 | 140 |
| polymer H | Decrease in molecular weight |  |  | ○ | ○ | ○ | X | X | ○ |
|  | Solubility |  |  | ○ | ○ | ○ | ○ | ○ | X |

In Ex. 1 to 3, fluorinated polymers having proper molecular weights were obtained even though no chain transfer agent was used. Further, the molecular weights did not decrease when —SO$_2$F groups in the fluorinated polymers were converted to ion exchange groups by using a base to obtain fluorinated ion exchange polymers.

In Ex. 4 and 5, the total amount of the fluorinated monomer m11H and the fluorinated monomer m12H was more than 1,100 ppm to the total amount of the monomer composition M11 and the monomer composition M12, whereby at the time when the fluorinated polymer was hydrolyzed by using a base, the molecular weight decreased to less than 500,000. Particularly, in Ex. 5, in which the total amount of the fluorinated monomer m11H and the fluorinated monomer m12H was large, the rate of decrease in the molecular weight was larger.

In Ex. 6, since the total amount of the fluorinated monomer m11H and the fluorinated monomer m12H was less than 10 ppm to the total amount of the monomer composition M11 and the monomer composition M12, the molecular weight of the fluorinated polymer was high, and the solubility in AK225 SEC Grade 1 was poor. When the liquid composition (dispersion) of the fluorinated ion exchange polymer was prepared by hydrolyzing the fluorinated polymer with a base, an undissolved fluorinated ion exchange polymer was confirmed on the filter.

INDUSTRIAL APPLICABILITY

In the method for producing a fluorinated polymer and the method for producing a fluorinated ion exchange polymer of the present invention, the total amount of the fluorinated monomer m11H and the fluorinated monomer m12H is from 10 to 1,100 ppm to the total amount of the monomer composition M11 and the monomer composition M12, whereby at the time when the raw material mixture is polymerized, the perfluoromonomers m11 and m12 can be efficiently utilized, and the molecular weight can easily be controlled to a proper level. Further, it is possible to obtain a fluorinated polymer having dioxolane ring structures, the molecular weight of which is less likely to decrease even when contacted with a base.

The fluorinated ion exchange polymer obtained by the production method of the present invention is useful as a precursor of an electrolyte material to be used for a catalyst layer in a membrane electrode assembly, a solid polymer electrolyte membrane, a cation exchange membrane for salt electrolysis, etc.

This application is a continuation of POT Application No. PCT/JP2019/019567, filed on May 16, 2019, which is based upon and claims the benefit of priority from Japanese Patent Application No, 2018-096465 filed on May 18, 2018. The contents of those applications are incorporated herein by reference in their entireties.

What is claimed is:

1. A method for producing a fluorinated polymer, the method comprising:
   synthesizing a perfluoromonomer represented by formula m11 to obtain a crude product C1 further containing a fluorinated monomer m11H represented by formula m21, and/or synthesizing a perfluoromonomer represented by formula m12 to obtain a crude product C2 further containing a fluorinated monomer m12H represented by formula m22;
   purifying the crude product C1 to adjust a content of the fluorinated monomer m11H to obtain a monomer composition M11 containing the perfluoromonomer m11 and the fluorinated monomer m11H, and/or purifying the crude product C2 to adjust a content of the fluorinated monomer m12H to obtain a monomer composition M12 containing the perfluoromonomer m12 and the fluorinated monomer m12H;
   mixing tetrafluoroethylene, at least one of the monomer composition M11 and the monomer composition M12 wherein a total amount of the fluorinated monomer m11H and the fluorinated monomer m12H to a total amount of the monomer composition M11 and the monomer composition M12 is from 10 to 1,100 ppm, and at least one monomer selected from the group consisting of a monomer represented by formula m31, a monomer represented by formula m32, a monomer represented by formula m33, a monomer represented by formula m34, a monomer represented by formula m35, a monomer represented by formula m36, and a monomer represented by formula m37, thereby obtaining a raw material mixture wherein a proportion of the total amount of the monomer composition M11 and the monomer composition M12 in a total amount of all monomers contained in the raw material mixture is from 40 to 80 mol %; and
   polymerizing the raw material mixture:

$$\begin{array}{c} FC=CF \\ O \quad O \\ \diagdown C \diagup \\ R^{12} \quad R^{11} \end{array} \quad \text{m11}$$

$$\begin{array}{c} FC=CF \\ O \quad O \\ \diagdown C \diagup \\ R^{14} \quad R^{13}SO_2F \end{array} \quad \text{m12}$$

$$\begin{array}{c} FC=CH \\ O \quad O \\ \diagdown C \diagup \\ R^{12} \quad R^{11} \end{array} \quad \text{m21}$$

$$\begin{array}{c} FC=CH \\ O \quad O \\ \diagdown C \diagup \\ R^{14} \quad R^{13}SO_2F \end{array} \quad \text{m22}$$

where
   $R^{11}$, $R^{12}$ and $R^{14}$ are each independently a fluorine atom, a $C_{1-10}$ perfluoroalkyl group, or a group having an etheric oxygen atom between carbon-carbon atoms in a $C_{2-10}$ perfluoroalkyl group, and
   $R^{13}$ is a single bond, a $C_{1-10}$ perfluoroalkylene group or a group having an etheric oxygen atom between carbon-carbon atoms in a $C_{2-10}$ perfluoroalkylene group;

$$\begin{array}{c} CF_2 \\ \| \\ C \\ O \diagup \diagdown O \\ F_2C - CF - QSO_2F \end{array} \quad \text{m31}$$

$$CF_2=CF(CF_2)_qOCF_2-CY^1 \diagup\diagdown \begin{array}{c} Q^1-SO_2F \\ Q^2-SO_2F \end{array} \quad \text{m32}$$

$$CF_2=CF(CF_2)_m-O_p-(CF_2)_n-SO_2F \quad \text{m33}$$

$$CF_2=CF(OCF_2CFX)_r-O_t-(CF_2)_s-SO_2F \quad \text{m34}$$

$$CF_2=CFCF_2OCF \diagup\diagdown \begin{array}{c} R^{F1}-SO_2F \\ R^{F2}-SO_2F \end{array} \quad \text{m35}$$

$$CF_2=CFOR^{F3}(O)_mCF \diagup\diagdown \begin{array}{c} R^{F1}-SO_2F \\ R^{F2}-SO_2F \end{array} \quad \text{m36}$$

$$CF_2=CFOCF \diagup\diagdown \begin{array}{c} R^{F1}-SO_2F \\ R^{F2}-SO_2F \end{array} \quad \text{m37}$$

where
   Q is a single bond, a $C_{1-10}$ perfluoroalkylene group, or a group having an etheric oxygen atom between carbon-carbon atoms in a $C_{2-10}$ perfluoroalkylene group,
   q is 0 or 1,
   $Y^1$ is a fluorine atom or a monovalent perfluoroorganic group,
   $Q^1$ is a perfluoroalkylene group which optionally has an etheric oxygen atom,
   $Q^2$ is a single group, or a perfluoroalkylene group which optionally has an etheric oxygen atom,
   m is 0 or 1, and when p is 0, m is 0,
   p is 0 or 1,
   n is an integer of from 1 to 12,
   X is a fluorine atom or a trifluoromethyl group,
   r is an integer of from 1 to 3,
   t is 0 or 1,
   s is an integer of from 1 to 12,
   $R^{F1}$ and $R^{F2}$ are each independently a $C_{1-3}$ perfluoroalkylene group, and
   $R^{F3}$ is a $C_{1-6}$ perfluoroalkylene group.

2. The method for producing a fluorinated polymer according to claim 1, wherein the raw material mixture further contains a polymerization medium.

3. The method for producing a fluorinated polymer according to claim 1, wherein the raw material mixture does not contain a chain transfer agent.

4. A method for producing a fluorinated ion exchange polymer, the method comprising:
   synthesizing a perfluoromonomer represented by formula m11 to obtain a crude product C1 further containing a fluorinated monomer m11H represented by formula m21, and/or synthesizing a perfluoromonomer represented by formula m12 to obtain a crude product C2 further containing a fluorinated monomer m12H represented by formula m22, purifying the crude product C1 to adjust a content of the fluorinated monomer m11H to obtain a monomer composition M11 containing the perfluoromonomer m11 and the fluorinated monomer m11H, and/or purifying the crude product C2 to adjust a content of the fluorinated monomer m12H to obtain a monomer composition M12 containing the perfluoromonomer m12 and the fluorinated monomer m12H;

mixing tetrafluoroethylene, at least one of the monomer composition M11 and the monomer composition M12 wherein a total amount of the fluorinated monomer m11H and the fluorinated monomer m12H to a total amount of the monomer composition M11 and the monomer composition M12 is from 10 to 1,100 ppm, and at least one monomer that has a precursor group for an ion exchange group and is selected from the group consisting of a monomer represented by formula m31, a monomer represented by formula m32, a monomer represented by formula m33, a monomer represented by formula m34, a monomer represented by formula m35, a monomer represented by formula m36, and a monomer represented by formula m37, thereby obtaining a raw material mixture wherein a proportion of the total amount of the monomer composition M11 and the monomer composition M12 in a total amount of all monomers contained in the raw material mixture is from 40 to 80 mol %;

polymerizing the raw material mixture to obtain a precursor group-containing fluorinated polymer, and contacting the precursor group-containing fluorinated polymer with a base to convert the precursor group to an ion exchange group:

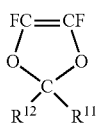
m11

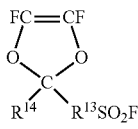
m12

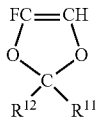
m21

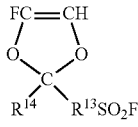
m22 where
$R^{11}$, $R^{12}$ and $R^{14}$ are each independently a fluorine atom, a $C_{1-10}$ perfluoroalkyl group, or a group having an etheric oxygen atom between carbon-carbon atoms in a $C_{2-10}$ perfluoroalkyl group, and $R^{13}$ is a single bond, a $C_{1-10}$ perfluoroalkylene group or a group having an etheric oxygen atom between carbon-carbon atoms in a $C_{2-10}$ perfluoroalkylene group;

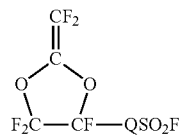
m31

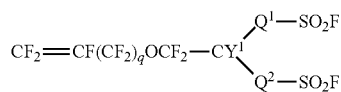
m32

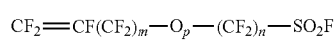
m33

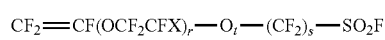
m34

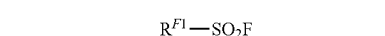
m35

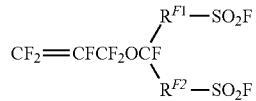
m36

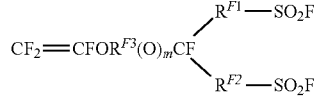
m37 where
Q is a single bond, a $C_{1-10}$ perfluoroalkylene group, or a group having an etheric oxygen atom between carbon-carbon atoms in a $C_{2-10}$ perfluoroalkylene group, q is 0 or 1, $Y^1$ is a fluorine atom or a monovalent perfluoroorganic group, $Q^1$ is a perfluoroalkylene group which optionally has an etheric oxygen atom, $Q^2$ is a single group, or a perfluoroalkylene group which optionally has an etheric oxygen atom, m is 0 or 1, and when p is 0, m is 0, p is 0 or 1, n is an integer of from 1 to 12, X is a fluorine atom or a trifluoromethyl group, r is an integer of from 1 to 3, t is 0 or 1, s is an integer of from 1 to 12, $R^{F1}$ and $R^{F2}$ are each independently a $C_{1-3}$ perfluoroalkylene group, and $R^{F3}$ is a $C_{1-6}$ perfluoroalkylene group.

5. The method for producing a fluorinated ion exchange polymer according to claim 4, wherein the ion exchange group is a sulfonic acid group.

6. A fluorinated polymer, obtained by the method according to claim 1.

7. An electrolyte material, comprising the fluorinated polymer according to claim 6.

8. A liquid composition, comprising a dispersion and the electrolyte material according to claim 7 dispersed in the dispersion, wherein the dispersion contains one or both of water and an organic solvent having a hydroxy group.

9. A membrane electrode assembly for a polymer electrolyte fuel cell, the membrane electrode assembly comprising
- an anode having a catalyst layer containing a proton conductive polymer,
- a cathode having a catalyst layer containing a proton conductive polymer, and
- a solid polymer electrolyte membrane disposed between the anode and the cathode, wherein the proton conductive polymer contained in at least one of the catalyst layers of the cathode and the anode is the electrolyte material according to claim 7.

10. A polymer electrolyte fuel cell, comprising the membrane electrode assembly according to claim 9.

* * * * *